United States Patent
Itani et al.

(10) Patent No.: US 7,907,064 B2
(45) Date of Patent: Mar. 15, 2011

(54) PARKING POSITION SEARCH ASSISTING APPARATUS, METHOD AND PROGRAM

(75) Inventors: Satoru Itani, Osaka (JP); Yuji Mizuguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 629 days.

(21) Appl. No.: 11/996,247

(22) PCT Filed: Jun. 14, 2006

(86) PCT No.: PCT/JP2006/311929
§ 371 (c)(1),
(2), (4) Date: Jan. 18, 2008

(87) PCT Pub. No.: WO2007/026456
PCT Pub. Date: Mar. 8, 2007

(65) Prior Publication Data
US 2009/0251333 A1    Oct. 8, 2009

(30) Foreign Application Priority Data
Aug. 30, 2005    (JP) .................................. 2005-250002

(51) Int. Cl.
*B60Q 1/48*    (2006.01)
(52) U.S. Cl. ........................ 340/932.2; 340/933; 340/937
(58) Field of Classification Search ............... 340/932.2, 340/933, 937; 701/1, 36, 41, 116, 301
See application file for complete search history.

(56) References Cited

U.S. PATENT DOCUMENTS

| 2001/0012979 | A1 | 8/2001 | Takenaga |
| 2004/0252192 | A1 | 12/2004 | Adachi et al. |
| 2005/0043871 | A1* | 2/2005 | Endo et al. ..................... 701/36 |

FOREIGN PATENT DOCUMENTS

| JP | 11-122638 | 4/1999 |
| JP | 2000-315296 | 11/2000 |
| JP | 2001-221643 | 8/2001 |
| JP | 2002-230124 | 8/2002 |
| JP | 2003-85696 | 3/2003 |
| JP | 2003-162793 | 6/2003 |
| JP | 2003-166836 | 6/2003 |
| JP | 2003-208699 | 7/2003 |
| JP | 2004-199604 | 7/2004 |
| JP | 2004-252661 | 9/2004 |
| JP | 2005-4480 | 1/2005 |
| JP | 2005-84714 | 3/2005 |

OTHER PUBLICATIONS

International Search Report issued Sep. 12, 2006 in the International (PCT) Application of which the present application is the U.S. National Stage.

* cited by examiner

*Primary Examiner* — Daryl Pope
(74) *Attorney, Agent, or Firm* — Wenderoth, Lind & Ponack, L.L.P.

(57) ABSTRACT

An image-taking control section determines, based on information outputted from a location information obtaining section, whether a vehicle has entered a car park. When the vehicle has entered the car park, an image storage section stores, at predetermined time intervals, images of a view in a traveling direction of the vehicle, which images are taken by a vehicle-mounted camera. Image taking is terminated when the vehicle is parked at a parking space and a parking brake is applied. Thereafter, the taken images are transmitted via a transmission section to a mobile terminal held by a user. The user is allowed to easily recognize the parking position of his/her vehicle by viewing the images with the mobile terminal.

20 Claims, 8 Drawing Sheets

F I G. 4

| IDENTIFICATION NUMBER | IMAGE-TAKING TIME POINT | VEHICLE LOCATION INFORMATION | TAKEN IMAGE | DISTANCE | DIRECTION |
|---|---|---|---|---|---|
| 1 | 13:05:23 | (120,241) | 001.jpg | 0m | 0° |
| 2 | 13:05:28 | (120,256) | 002.jpg | 10m | 10° |
| 3 | 13:05:33 | (140,270) | 003.jpg | 22m | 45° |
| 4 | 13:05:38 | (150,280) | 004.jpg | 40m | 60° |
| ⋮ | ⋮ | ⋮ | ⋮ | ⋮ | ⋮ |
| n (PARKING POSITION) | 13:07:24 | (170,312) | 014.jpg | 100m | 90° |

PARKING POSITION SEARCH ASSISTING APPARATUS, METHOD AND PROGRAM

TECHNICAL FIELD

The present invention relates to a vehicle location search assisting apparatus, and particularly to a parking position search assisting apparatus for assisting a search for a parking position of a vehicle in a car park.

BACKGROUND ART

Conventionally, there has been a disclosed system, which is described below, for providing information about a parking position of a particular vehicle at a car park. First, an RFID tag is attached to a vehicle, and parking spaces in the car park are each provided with a noncontact reader/writer. When the vehicle is parked at a particular parking space in the car park, the parking position of the vehicle is recognized by reading the RFID tag. Then, a parking position of each vehicle is, together with a layout of the car park, displayed on display means such as a large panel provided in the car park (e.g., patent document 1). This allows each user to recognize where his/her vehicle is parked in the car park.

[Patent Document 1] Japanese Laid-Open Patent Publication No. 2004-199604

SUMMARY OF THE INVENTION

Problems to be Solved by the Invention

However, the above car parking system has a problem described below. In the case of a large-sized car park, providing the aforementioned noncontact reader/writer for all the parking spaces is very costly. Further, in the case of a large-sized car park, even if the noncontact reader/writer is provided for all the parking spaces and the parking positions of vehicles are displayed on a panel or the like as described above, it is highly conceivable that while a user moves from such a display apparatus to a parking position of his/her vehicle, the user forgets the parking position before arriving the parking position, because the car park is very large. There is a conceivable method using a GPS navigation function of a mobile phone, in which method a user looks at the mobile phone which guides the user to a position of his/her vehicle. However, this method is not applicable to such a place as basement car park where radio waves do not reach.

Therefore, an object of the present invention is to provide a parking position search assisting apparatus which is low-cost and which allows a user to easily recognize a parking position of his/her vehicle.

Solution to the Problems

The present invention has the following features to achieve the object mentioned above.

A first aspect of the present invention is a parking position search assisting apparatus to be mounted on a movable body having an image taking section for taking an image, the parking position search assisting apparatus comprising: an image storage section for storing the image taken by the image taking section; an image-taking control section for, in accordance with a parking operation of the movable body, causing the image storage section to start or end image storing; and a transfer section for transferring, to a predetermined mobile terminal or to a server accessible from the mobile terminal, the image stored in the image storage section.

In a second aspect of the present invention based on the first aspect, the parking position search assisting apparatus further comprises a facility entry detection section for detecting that the movable body has entered a facility. Based on a signal from the facility entry detection section, the image-taking control section causes, when the movable body has entered a predetermined facility, the image taking section to start image taking.

In a third aspect of the present invention based on the first aspect, the parking position search assisting apparatus further comprises a GPS receiver and a navigation guide section for, based on a signal from the GPS receiver and map information, displaying on a map a location of a vehicle, or performing route guidance.

In a fourth aspect of the present invention based on the third aspect, when the movable body has arrived at a predetermined facility, the image-taking control section causes, based on a signal from the navigation guide section, the image storage section to start image storing.

In a fifth aspect of the present invention based on the third aspect, when the GPS receiver has become unable to receive a radio wave from a GPS satellite, the image-taking control section causes, based on the signal from the GPS receiver, the image storage section to start image storing.

In a sixth aspect of the present invention based on the third aspect, when confirming that the movable body has approached a predetermined destination within a predetermined distance and has deviated from a road, the image-taking control section causes, based on a signal from the navigation guide section, the image storage section to start image storing.

In a seventh aspect of the present invention based on the first aspect, when a headlight of the movable body has turned on, the image-taking control section causes, based on a signal from a vehicle information obtaining section for obtaining a state of the headlight of the movable body, the image storage section to start image storing.

In an eighth aspect of the present invention based on the first aspect, when a parking brake of the movable body is applied, the image-taking control section causes, based on a signal from a vehicle information obtaining section for obtaining a state of the parking brake of the movable body, the image storage section to end image storing.

In a ninth aspect of the present invention based on the first aspect, when a gear of the movable body is shifted to parking, the image-taking control section causes, based on a signal from a vehicle information obtaining section for obtaining a state of the gear of the movable body, the image storage section to end image storing.

In a tenth aspect of the present invention based on the first aspect, when an engine of the movable body is turned off, the image-taking control section causes, based on a signal from a vehicle information obtaining section for obtaining a state of the engine of the movable body, the image storage section to end image storing.

In an eleventh aspect of the present invention based on the first aspect, in response to the image-taking control section having caused the image storage section to end image storing, the transfer section collectively transfers images stored in the image storage section to the mobile terminal or to the server.

In a twelfth aspect of the present invention based on the first aspect, each time the image taken by the image taking section is outputted from the image taking section, the transfer section sequentially transfers the image to the mobile terminal or to the server.

In a thirteenth aspect of the present invention based on the first aspect, the image-taking control section causes the image storage section to store the image as a still image.

In a fourteenth aspect of the present invention based on the first aspect, the image-taking control section causes the image storage section to store the image as a moving image.

In a fifteenth aspect of the present invention based on the first aspect, in response to a user having steered the movable body, the image-taking control section selectively causes the image storage section to store a still image or a moving image.

In a sixteenth aspect of the present invention based on the fifteenth aspect, when the user is turning the movable body, the image-taking control section causes the image storage section to store the image as a moving image, and when the user is not turning the movable body, the image-taking control section causes the image storage section to store the image as a still image.

In a seventeenth aspect of the present invention based on the first aspect, the transfer section includes an image selection section for selecting an image containing a letter or a symbol from among images stored in the image storage section, and transfers only the image selected by the image selection section to the mobile terminal or to the server.

In an eighteenth aspect of the present invention based on the seventeenth aspect, the image selection section performs image processing on the image containing a letter or a symbol so as to add a mark to the image, which mark emphasizes the letter or the symbol, and the transfer section transfers, to the mobile terminal or to the server, the image on which the image processing has been performed.

In a nineteenth aspect of the present invention based on the seventeenth aspect, the image selection section performs image processing on the image stored in the image storage section, so as to add, to the image, a display of a time point at which the image has been taken, and the transfer section transfers, to the mobile terminal or to the server, the image on which the image processing has been performed.

In a twentieth aspect of the present invention based on the seventeenth aspect, the image selection section performs image processing on the image stored in the image storage section, so as to add, to the image, a display of vehicle information indicating a state of the movable body at the time of taking the image, and the transfer section transfers, to the mobile terminal or to the server, the image on which the image processing has been performed.

In a twenty-first aspect of the present invention based on the first aspect, a power supply to the parking position search assisting apparatus is halted at a time point when the engine of the movable body stops, or when a predetermined period of time has elapsed from the time point when the engine of the movable body stops, and the transfer section completes transferring images stored in the image storage section, at the time point when the engine of the movable body stops, or before a predetermined period of time has elapsed from the time point when the engine of the movable body stops.

In a twenty-second aspect of the present invention based on the first aspect, the transfer section transfers image data containing information indicating time points at which images stored in the image storage section have been taken, and the images are displayed on the mobile terminal in chronological order.

In a twenty-third aspect of the present invention based on the first aspect, the transfer section includes a route image generation section for generating, based on information indicating: time points at which images stored in the image storage section have been taken; and locations of the movable body when the images have been taken, a route image which chronologically displays a relative route on which the movable body has traveled, and transmitting, to the mobile terminal or to the server, the route image generated by the route image generation section together with the images stored in the image storage section.

A twenty-fourth aspect of the present invention is a parking position search assisting method comprising: an image taking step of taking an image; an image storing step of storing the image taken at the image taking step; an image-taking start condition determining step of determining whether or not a predetermined condition related to a start of a parking operation of the movable body is satisfied; an image-taking termination condition determining step of determining whether or not a predetermined condition related to a termination of the parking operation of the movable body is satisfied; an image-taking controlling step of performing the image storing step at predetermined time intervals from when it is determined at the image-taking start condition determining step that the condition related to the start of the parking operation is satisfied to when it is determined at the image-taking termination condition determining step that the condition related to the termination of the parking operation is satisfied; and a transferring step of transferring the image stored at the image storing step to a predetermined mobile terminal or to a server accessible from the mobile terminal.

A twenty-fifth aspect of the present invention is a parking position search assisting program to be executed by a computer of a parking position search assisting apparatus to be mounted on a movable body having an image taking section for taking an image, the parking position search assisting program causing the computer to perform: an image storing step of storing the image taken at the image taking step; an image-taking start condition determining step of determining whether or not a predetermined condition related to a start of a parking operation of the movable body is satisfied; an image-taking termination condition determining step of determining whether or not a predetermined condition related to a termination of the parking operation of the movable body is satisfied; an image-taking controlling step of causing the image storing step to store the image at predetermined time intervals from when it is determined at the image-taking start condition determining step that the condition related to the start of the parking operation is satisfied to when it is determined at the image-taking termination condition determining step that the condition related to the termination of the parking operation is satisfied; and a transferring step of transferring the image stored at the image storing step to a predetermined mobile terminal or to a server accessible from the mobile terminal.

Effect of the Invention

According to the above first aspect, images are taken until the movable body is parked, and the images can be transmitted to a terminal or the like. This allows a user to view the images with the terminal when moving to a parking position of his/her vehicle, and intuitively recognize the parking position. As a result, the user can arrive at the parking position without losing his/her way.

According to the above second aspect, image taking starts when the movable body has entered a predetermined facility. Therefore, the user is not required to perform an operation to start image taking, and thus usability is improved.

According to the above third aspect, image taking and image storing can be controlled using GPS. This enables precise control of image taking.

According to the above fourth aspect, image taking starts when GPS detects that the movable body has arrived at a destination or the like. Therefore, the user is not required to perform an operation to start image taking, and thus usability is improved.

According to the above fifth aspect, image taking can be started even at such a place as basement car park where radio waves of the GPS do not reach, and thus convenience is improved.

According to the above sixth aspect, image taking starts at a timing at which the movable body located near the destination deviates from a road. For this reason, more image information can be obtained in order for the user to recognize the parking position. Consequently, the user is allowed to recognize the parking position more easily.

According to the above seventh aspect, image taking can be started even at such a place as a basement car park where radio waves of the GPS do not reach, and thus convenience is improved.

According to the above eighth to tenth aspects, image taking is terminated in relation to an operation which is commonly performed to complete a parking operation. For this reason, the user is not required to perform a particular operation to terminate image taking. This makes it possible to provide a highly usable parking position search assisting apparatus for the user.

According to the above eleventh aspect, all the stored images are transferred to the mobile terminal or the like. This makes it possible to provide the user with all the necessary information for recognizing the parking position. As a result, the user is allowed to recognize the parking position more easily.

According to the above twelfth aspect, each time the image is taken, the image is transferred to the mobile terminal or the like. This eliminates waiting time for image transfer to be performed immediately after the movable body is parked, whereby usability for the user is improved.

According to the above thirteenth aspect, the image related to a parking operation is taken as a still image. Thus, image storage capacity can be saved.

According to the above fourteenth aspect, the image related to the parking operation is taken as a moving image. This allows the user to recognize the parking position more easily.

According to the above fifteenth and sixteenth aspects, image taking can be performed such that, the image is taken as a moving image only when steering which is impressive for the user is performed in the process of parking, otherwise the image is taken as a still image. This reduces storage capacity to be used to store data of taken images, and also makes it possible to provide information in the form of moving image in the case where the moving image allows the user to recognize the parking position more easily.

According to the above seventeenth and eighteenth aspects, image transfer can be limited to only the image which serves as a significant clue for the user to recognize the parking position. For this reason, unnecessary transfer of taken images to the mobile terminal is reduced. Further, the image, which has been processed such that a portion thereof serving as the significant clue is emphasized, is displayed, whereby the user is allowed to recognize the parking position more easily.

According to the above nineteenth and twentieth aspects, information for helping the user to remember a situation, which the user was in when image taking was performed, is displayed on the image displayed on the terminal. This allows the user to easily remember the parking operation. As a result, the user can recognize the parking position more easily.

According to the above twenty-first aspect, even if the user stops the engine immediately after parking the movable body, power supply is not halted until the image transfer is completed. This prevents the image transfer from being terminated before completion due to the halt to the power supply caused by the stop of the engine.

According to the above twenty-second aspect, taken images which are arranged in chronological order are displayed. This allows the parking position to be more recognizable for the user.

The above twenty-third aspect allows the route, on which the vehicle has traveled for the parking operation, to be more recognizable for the user. As a result, the user can easily recognize the parking position.

The parking position search assisting method and program of the present invention produce the same effects as those of the above-described first aspect.

BRIEF DESCRIPTION OF THE DRAWINGS

FIG. 4 shows an exemplary data structure of image data.

Figure 1:
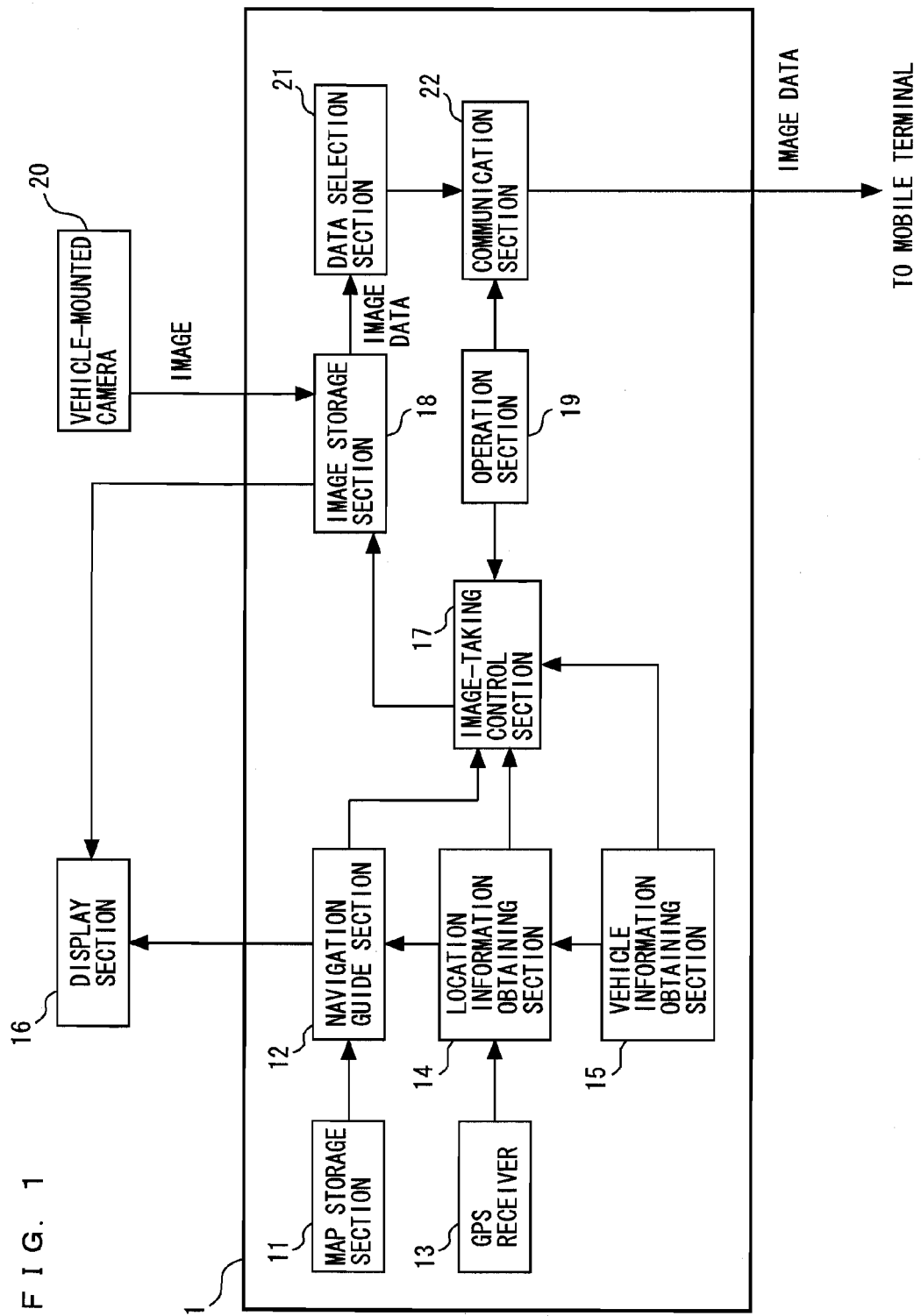
FIG. 1 is a functional block diagram showing a parking position search assisting apparatus according to an embodiment of the present invention.

DESCRIPTION OF THE REFERENCE CHARACTERS 11 map storage section
12 navigation guide section
13 GPS receiver
14 location information obtaining section
15 vehicle information obtaining section
16 display section
17 image-taking control section
18 image storage section
19 operation section
20 vehicle-mounted camera
21 data selection section
22 communication section
23 communication section
24 storage section
25 display control section
26 display section
40 drive recorder
401 vehicle-mounted camera
402 data storage section

DETAILED DESCRIPTION OF THE INVENTION

Hereinafter, an embodiment of the present invention will be described with reference to the drawings. Note that, the present invention is not limited to this embodiment.

FIG. 1 is a block diagram showing a configuration of a parking position search assisting apparatus (hereinafter, referred to as an assisting apparatus) according to the embodiment of the present invention. As shown in FIG. 1, an assisting apparatus 1 comprises a map storage section 11, navigation guide section 12, GPS receiver 13, location information obtaining section 14, vehicle information obtaining section 15, display section 16, image-taking control section 17, image storage section 18, operation section 19, vehicle-mounted camera 20, data selection section 21 and a communication section 22.

The map storage section 11 stores map data to be used for navigating, e.g., a route to a destination for a user. The GPS receiver 13 receives a radio wave from a GPS satellite, thereby detecting a location of a vehicle. The navigation guide section 12 refers to the map data stored in the map storage section 11, and multiplexes the vehicle location obtained by the GPS receiver 13 with the map data, and then provides a display on the display section 16. Alternatively, the navigation guide section 12 generates, e.g., data of the route to the destination, and displays the data on the display section 16. The location information obtaining section 14 obtains, from the GPS receiver 13, information about the location of the vehicle, and outputs the information to the image-taking control section 17. The vehicle information obtaining section 15 obtains vehicle information, e.g., a state of a parking brake, a gear or the like. Also, the vehicle information obtaining section 15 uses a gyro sensor, speed sensor or the like to obtain other vehicle information, e.g., a traveling direction and a velocity of the vehicle. Further, the vehicle information obtaining section 15 outputs these obtained information to the location information obtaining section 14 and image-taking control section 17. The display section 16 is, e.g., an LCD monitor which displays, e.g., navigation information and information necessary for processing performed in the present embodiment. Based on information outputted from at least one of the navigation guide section 12, location information obtaining section 14 and vehicle information obtaining section 15, the image-taking control section 17 outputs a control signal for controlling the image storage section 18. The image storage section 18 has storing means such as a hard disk which stores, in accordance with the control signal from the image-taking control section 17, video images and images taken by the vehicle-mounted camera 20. The operation section 19 receives various operations performed by a user, and outputs information about the operations to the image-taking control section 17 and communication section 22. The vehicle-mounted camera 20 is mounted facing a traveling direction of the vehicle, and takes images of a view in a forward direction when an engine is in operation. Also, the vehicle-mounted camera 20 outputs the taken images to the image storage section 18. The data selection section 21 selects a predetermined image from among the images stored in the image storage section 18, and outputs the selected image to the communication section 22. The communication section 22 uses Bluetooth technology to output, to a later-described mobile terminal 2, image data outputted from the data selection section 21. Note that, the vehicle-mounted camera may be mounted in any position and face any direction. The vehicle-mounted camera may take images of a view in an upper direction or a sideward direction.

Figure 2:
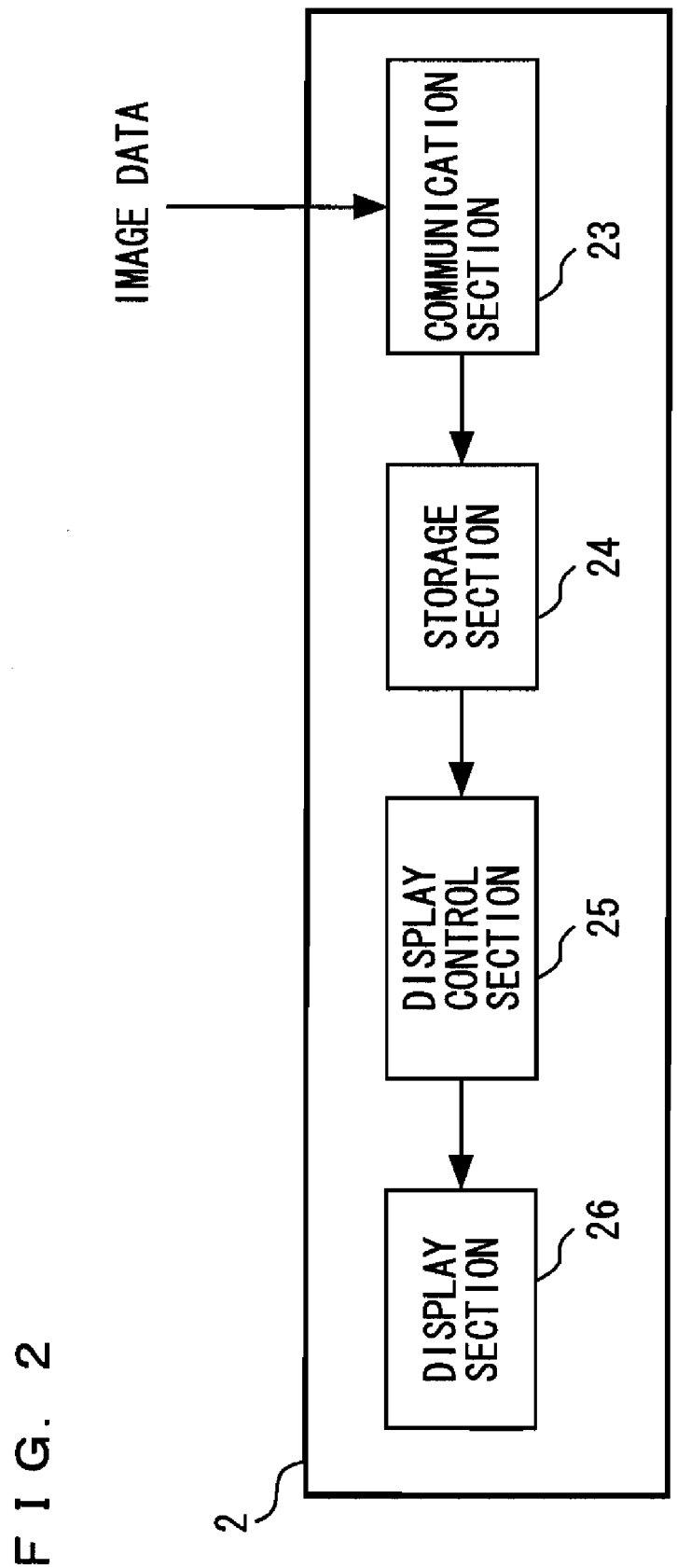
FIG. 2 is a functional block diagram showing a mobile terminal according to the embodiment of the present invention.

FIG. 2 is a block diagram showing a configuration of the mobile terminal 2 according to the embodiment of the present invention. As shown in FIG. 2, the mobile terminal 2 comprises a communication section 23, storage section 24, display control section 25 and a display section 26.

In FIG. 2, the communication section 23 communicates with the assisting apparatus 1, thereby obtaining the aforementioned image data. The storage section 24 stores the image data obtained via the communication section 23. The display control section 25 obtains the image data from the storage section 24, and outputs the image data to the display section 26. The display section 26 is, e.g., an LCD monitor for displaying the image data outputted from the display control section 25.

Figure 3:
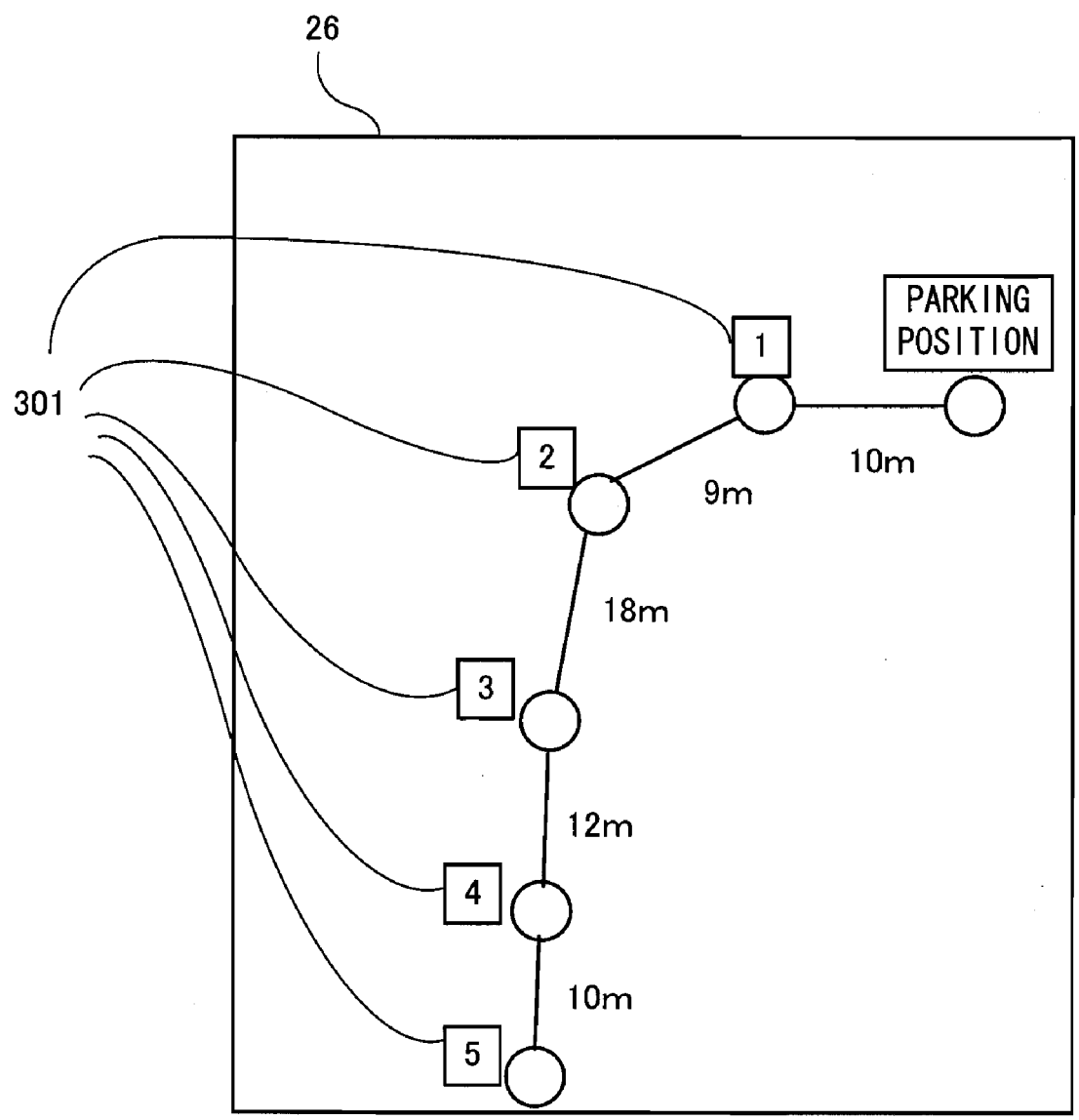
FIG. 3 shows an exemplary index image.

Next, operations performed by the assisting apparatus 1 and mobile terminal 2 configured as above will be briefly described. First, a vehicle having the above assisting apparatus 1 mounted thereon approaches a car park within a predetermined distance. Then, the navigation guide section 12 detects that the vehicle has approached the car park, and the navigation guide section 12 notifies the image-taking control section 17 that the vehicle has approached the car park. Upon receiving the notification, the image-taking control section 17 causes the image storage section 18 to store images of a view in the traveling direction of the vehicle. Such image storing is, for example, performed at intervals of five seconds until the vehicle stops at a particular parking space and the user applies a parking brake. At the timing when the parking brake is applied, the image-taking control section 17 causes the image storage section 18 to terminate image storing. Thereafter, the data selection section 21 selects predetermined images from among taken images stored in the image storage section 18, and transmits the selected images via the communication section 22 to the mobile terminal 2 (e.g., a mobile phone) of the user by using Bluetooth technology. When the image transmission is completed, the user turns off the engine, and alights from the vehicle with the mobile terminal 2. Thereafter, when the user returns to an entrance of the car park after, e.g., shopping, the user instructs the mobile terminal 2 to display the aforementioned images, i.e., the user causes the mobile terminal 2 to display the images which have been seen from the vehicle-mounted camera prior to the vehicle stopping at the parking space. At this point, the mobile terminal 2 displays, in addition to the images taken by the vehicle-mounted camera 20, such an image as shown in FIG. 3 which allows the user to recognize a relative driving route and a distance from the entrance to the parking position (hereinafter, referred to as an index image). In FIG. 3, the index image displays the driving route and a distance between each image taking point, together with label images 301 each indicating an image taking point. The user is able to view, by selecting a label image 301, an image which has been taken by the vehicle-mounted camera 20 at a corresponding image taking point. This allows the user to recognize the entire driving route which his/her vehicle has taken to the parking position, and refer to the images taken by the vehicle-mounted camera 20 to arrive at the parking position of his/her vehicle without losing his/her way.

Next, data used in the present embodiment will be described. FIG. 4 shows a data structure of the image data to be stored in the image storage section 18. In FIG. 4, the image data comprises sets of identification numbers, image-taking time points, vehicle location information, taken images, distances and directions. The identification numbers are each uniquely allocated to a piece of image data for identification. The identification numbers to be allocated start from 1 and end with a last number n which indicates a parking position. The image-taking time points indicate time points at which the above taken images have been respectively stored. The vehicle location information indicates locations of the vehicle at the time of storing the respective taken images. For example, a location of the vehicle is calculated from, e.g., coordinate data, which is obtained from the location information obtaining section 14 when the vehicle enters the car park, and the traveling direction and velocity of the vehicle which are obtained from the vehicle information obtaining section 15. Then, the calculated location is stored. The taken images are images which are taken by the vehicle-mounted camera 20 and stored in, e.g., JPEG format. The distances each indicate a distance which the vehicle has traveled after entering the car park. The directions indicate directions of the vehicle at the time of storing the respective taken images. The directions of the vehicle are represented as follows: a forward direction (traveling direction) of the vehicle at the time of entering the car park is represented as 0°; a backward direction thereof is represented as 180°; a leftward direction thereof is represented as 181° to 359°; and a rightward direction thereof is represented as 1° to 179°. These distances and directions are both calculated from the coordinate data obtained from the location information obtaining section 14.

Figure 5:
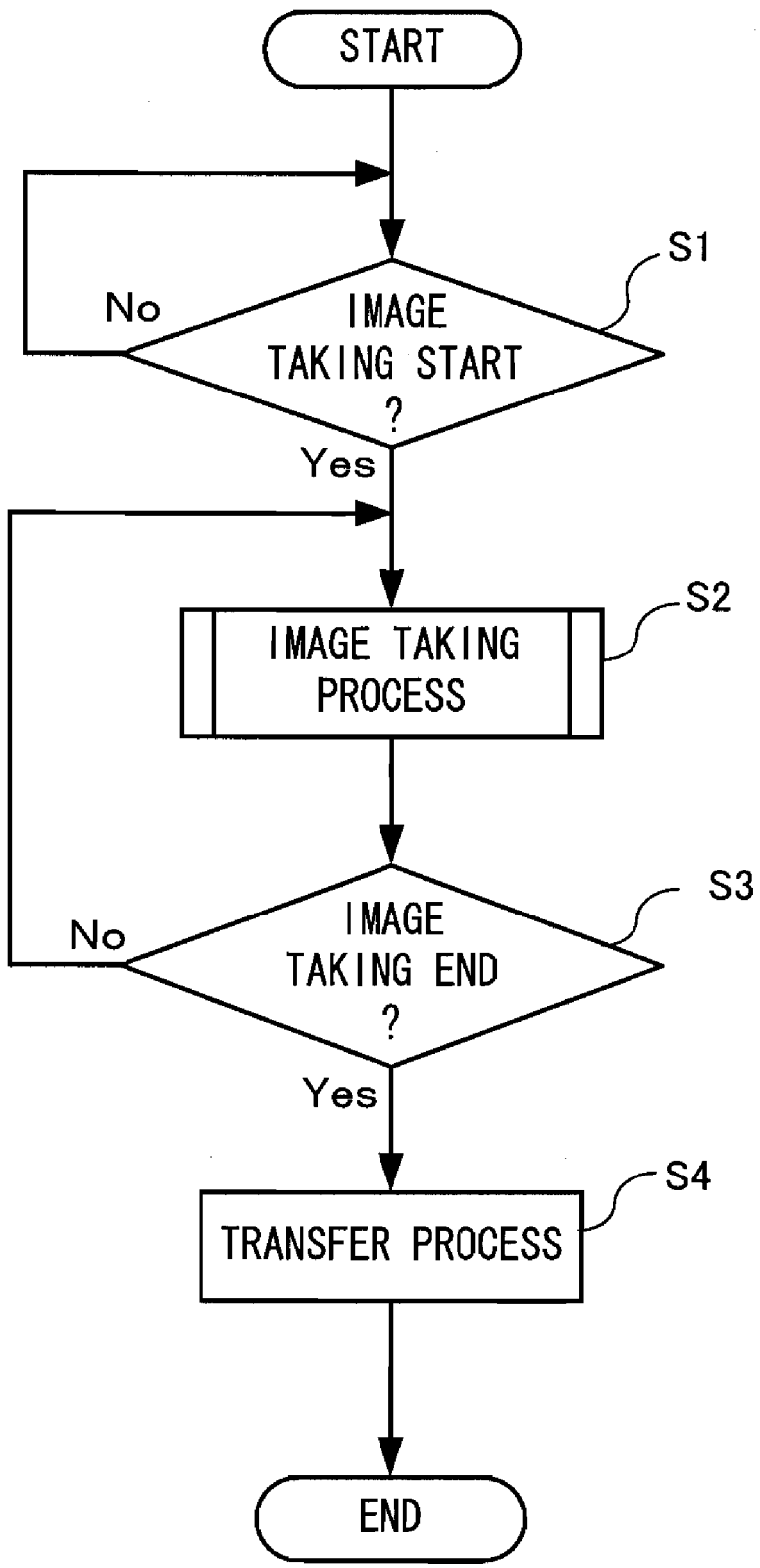
FIG. 5 is a flowchart showing a parking position search assisting process according to the embodiment of the present invention.
Figure 6:
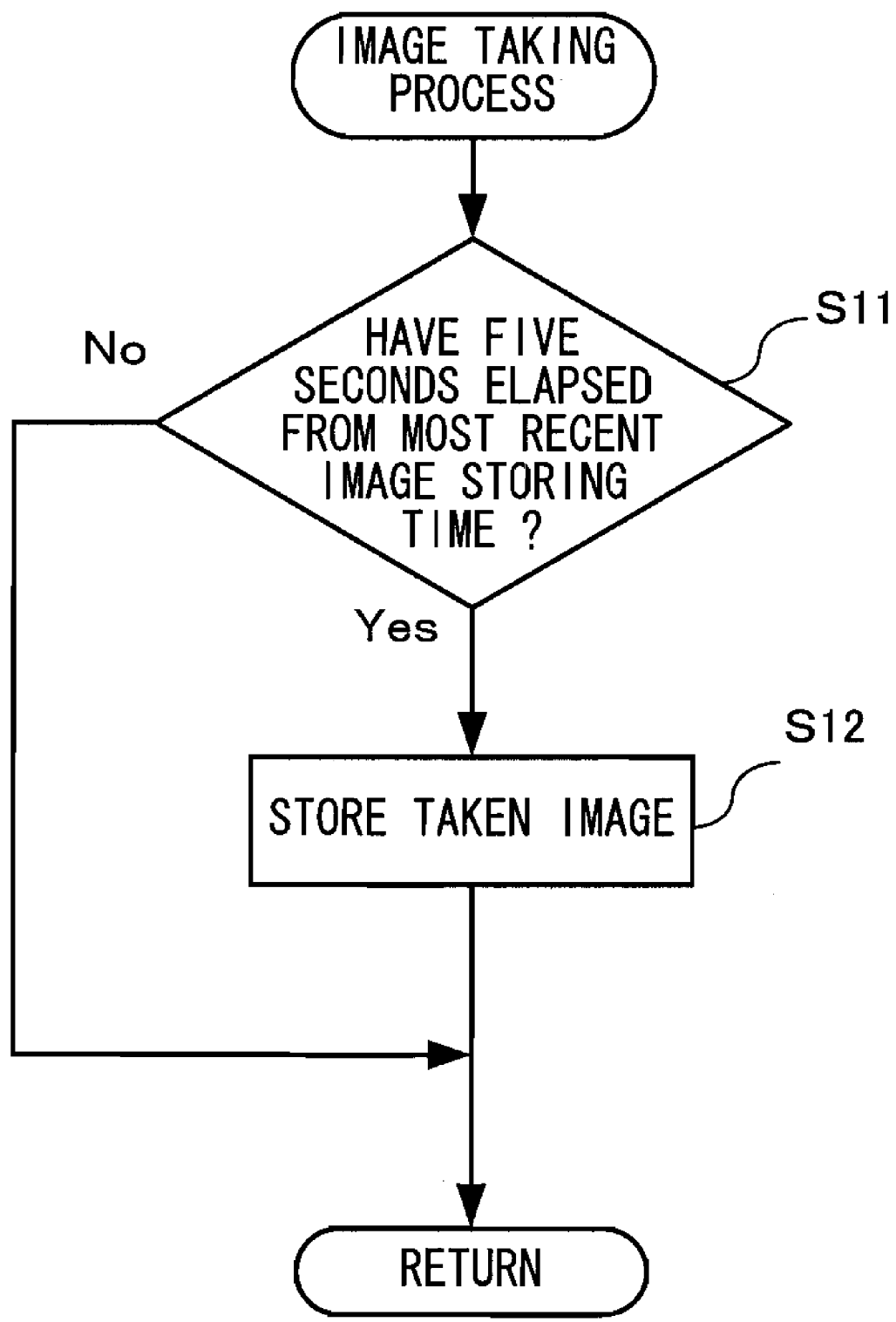
FIG. 6 is a flowchart showing in detail an image taking process of step S2 of FIG. 5.
Figure 7:
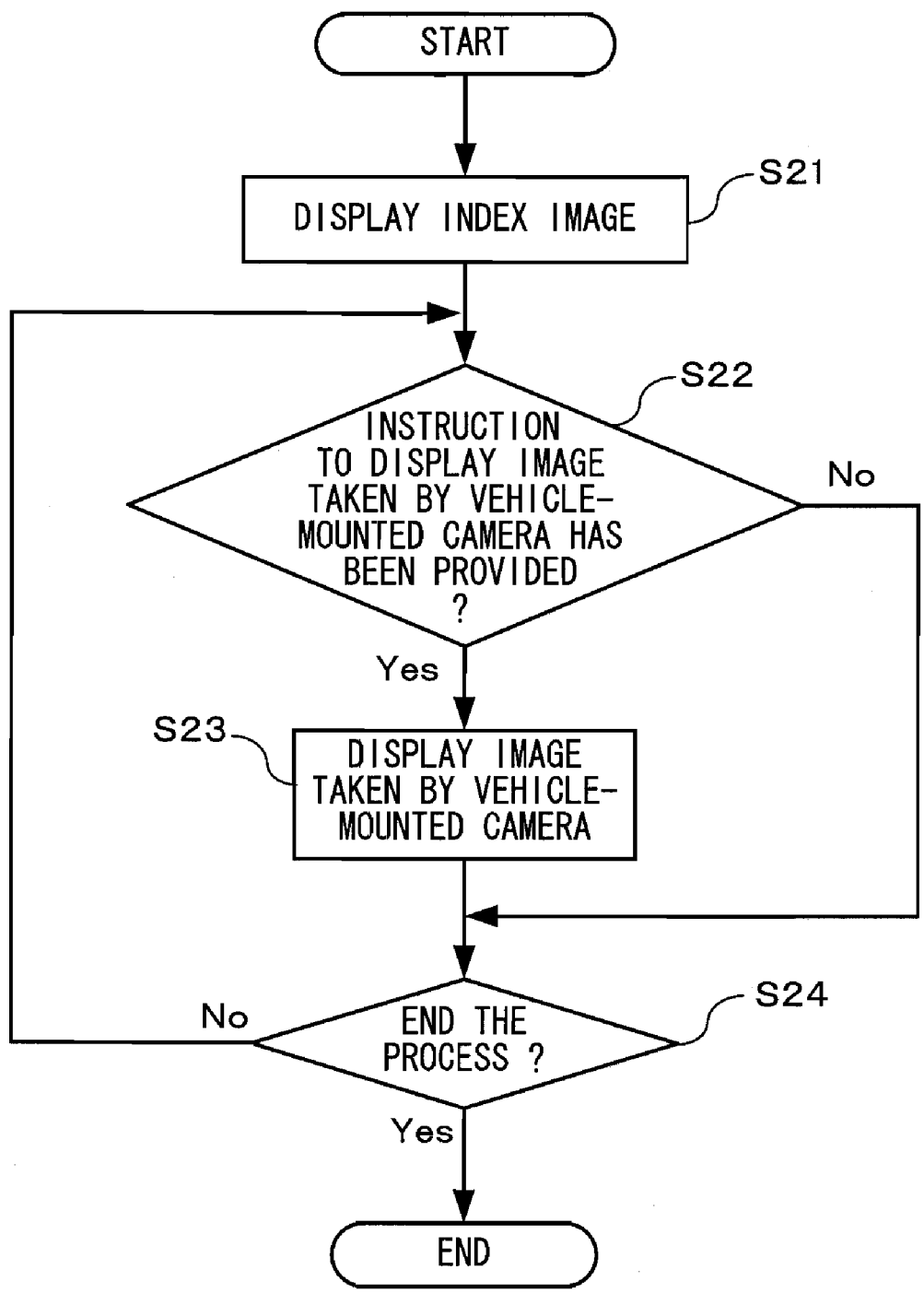
FIG. 7 is a flowchart showing an image display process according to the embodiment of the present invention.

Described below in detail with reference to FIGS. 5 to 7 are operations performed in a parking position search assisting process realized by the assisting apparatus 1 and mobile terminal 2.

Operations performed by the assisting apparatus 1 are described with reference to a flowchart of FIG. 5. As shown in FIG. 5, the image-taking control section 17 determines, at predetermined intervals, whether or not an image-taking start condition has been satisfied (step S1). The image-taking start condition is, for example, to confirm that the vehicle has approached facilities (typically, a car park) as described above. When the navigation guide section 12 and GPS receiver 13 detect that the vehicle has approached the car park within a predetermined distance, the image-taking control section 17 is notified that the vehicle has approached the car park within the predetermined distance. When the image-taking control section 17 has received the notification (YES at step S1), the image-taking control section 17 starts an image taking process as described below. On the other hand, when the image-taking control section 17 has not received the notification yet (NO at step S1), the process at step S1 is repeatedly performed until the image-taking control section 17 receives the notification.

Next, when the image-taking start condition is satisfied, the image-taking control section 17 performs the image taking process for storing, in the image storage section 18, images of a view in the traveling direction of the vehicle at intervals of five seconds (step S2). FIG. 6 is a flowchart showing in detail the image taking process of the above step S2. As shown in FIG. 6, the image-taking control section 17 first determines whether or not five seconds have elapsed from a most recent image storing time (image-taking time point) (step S11). When five seconds have not elapsed (NO at step S11), the image-taking control section 17 terminates the image taking process. On the other hand, when five seconds have elapsed, the image-taking control section 17 causes the image storage section 18 to store an image currently taken by the vehicle-mounted camera 20 (step S12). Then, the image taking process ends.

Return to FIG. 5. After the image taking process at step S2, the image-taking control section 17 determines whether or not an image-taking termination condition has been satisfied (step S3). The image-taking termination condition is to apply the parking brake as described above. When the user has applied the parking brake, the vehicle information obtaining section 15 detects that the parking brake has been applied, and notifies the image-taking control section 17 accordingly. Upon receiving the notification, the image-taking control section 17 determines that the image-taking termination condition has been satisfied (YES at step S3), and the processing proceeds to a next step S4. On the other hand, when the image-taking termination condition has not been satisfied (NO at Step S3), the image-taking control section 17 returns to the above step S2, and reiterates the processes.

Next, at step S4, a transfer process for transferring the stored image to the mobile terminal 2 is performed (step S4). This process at step S4 is described below in detail. First, the data selection section 21 obtains, from the image storage section 18, image data to be transferred. Selected here as the image data to be transferred is characteristic image data. It is assumed here that images each containing a letter or symbol (for example, images each containing, e.g., a numeral indicating a number on the parking position, or an arrow indicating the traveling direction) are selected. In other words, the data selection section 21 analyzes image data stored in the image storage section 18, and detects images each containing a numeral or arrow. Then, pieces of image data of the images are outputted to the communication section 22. At the same time, the data selection section 21 generates the index image as shown in FIG. 3. To be specific, the data selection section 21 generates label images 301 associated with the pieces of image data. Next, a relative location of the vehicle at a time when each image has been stored is calculated based on an image-taking time point of each piece of image data and vehicle location information about each piece of image data (note that, for example, these information are, when each taken image is stored in the image storage section 18 as image data, stored together with the image data so as to be associated with the image data). Then, based on the relative location, a display position of each label image 301 on a screen is determined, and then an index image as shown in FIG. 3, which shows in chronological order a route on which the vehicle has traveled, is generated. Then, the data selection section 21 outputs such an index image to the communication section 22. The communication section 22 transmits, to the mobile terminal 2, the outputted pieces of image data and index image. The communication section 23 of the mobile terminal 2 receives and stores the pieces of image data and index image in the storage section 24. Note that, for the communications between the assisting apparatus 1 and mobile terminal 2, Bluetooth technology is used whereby transmission to the mobile terminal 2, which is pre-registered as a transmission destination, is performed. However, since details of the communications are not directly relevant to the present invention, a detailed description thereof will be omitted. When the above image transmission is completed, the data selection section 21 deletes image data stored in the image storage section 18. Then, the transfer process at step S4 ends.

When the above transfer process ends, the engine is turned off, and the assisting apparatus 1 is turned off accordingly. Then, the processing by the assisting apparatus 1 ends. In this example, the assisting apparatus 1 uses a vehicle-mounted battery as a power source. For this reason, it is preferred that the assisting apparatus 1 is turned off when the engine is turned off, or before a predetermined period of time elapses after the engine is turned off.

Next, an image display process performed by the mobile terminal 2 will be described with reference to FIG. 7. FIG. 7 is a flowchart showing in detail the image display process which is performed when the user provides an instruction to display the aforementioned images. As shown in FIG. 7, the display control section 25 first displays the above-described index image (see FIG. 3) (step S21).

Next, the display control section 25 determines whether or not any one of the label images 301 shown in the index image has been designated. In other words, it is determined whether or not an instruction to display an image taken by the vehicle-mounted camera has been provided (step S22). When a result of the determination indicates that any label has been designated by the user (YES at step S22), an image taken by the vehicle-mounted camera, which image is associated with said any label, is read from the storage section 24, and then displayed (step S23). Next, the display control section 25 determines whether or not an instruction to end the image display process has been provided (step S24). When a result of the determination indicates that an instruction to end the image display process has not been provided yet, the display control section 25 returns to the above step S22, and reiterates the processes. On the other hand, when an instruction to end the image display process has been provided, the display control section 25 ends the image display process performed by the mobile terminal 2. Then, the parking position search assisting process realized by the assisting apparatus 1 and mobile terminal 2 ends.

As described above, in the present embodiment, images are taken by the vehicle-mounted camera until the vehicle is parked, and the images are transmitted to the mobile terminal. This allows the user to view the images with the mobile terminal when moving to the parking position. This enables the user to intuitively recognize the parking position. Consequently, the user can arrive at the parking position without losing his/her way. Further, unlike the conventional technique, it is not necessary to install special equipment, such as a noncontact reader/writer, in all the parking positions in the car park, and this reduces a cost of building a car park as well as a cost of managing the car park. Still further, the parking position of the vehicle can be recognized even in the case where the vehicle is parked at a place, e.g., a basement car park, where radio waves of the GPS do not reach and GPS navigation functions of the mobile terminal are unavailable.

Note that, the image-taking start condition at the above step S1 is not limited to the confirmation of the approach to the facilities. The determination at step S1 may be based on other conditions. For example, deviation of the vehicle from a road when the vehicle has approached to a destination within a predetermined distance may be set as the image-taking start condition. In this case, the image-taking control section 17 may determine, based on information obtained from the navigation guide section 12, whether the condition has been satisfied. Alternatively, assuming that the vehicle has entered, e.g., a basement car park, the GPS receiver 13 becoming unable to receive radio waves from the GPS satellite (this can be determined based on a signal from the GPS receiver 13), or lights (headlights) of the vehicle turning on (this can be determined based on a signal from the vehicle information obtaining section 15), may be set as the image-taking start condition. Providing, directly from the user to the assisting apparatus 1 via the operation section 19, an instruction to start image taking may, of course, be set as the image-taking start condition. Thus, by setting such that image taking starts when various operations related to a parking operation are performed, image taking can be started wherever the vehicle is located, particularly regardless of whether the vehicle is located at a place where the radio waves from GPS reach or do not reach.

Further, ETC (Electronic Toll Collection System) using DSRC (Dedicated Short Range Communication), which is used for a fee collection apparatus at a car park, may be used for the image-taking start condition. For example, a facility entry detection section for detecting a timing at which the vehicle has passed an ETC gate, i.e., detecting an entry of the vehicle to the facilities, is provided in the assisting apparatus 1. Then, detecting, by the facility entry detection section, the entry to the facilities may be set as the image-taking start condition.

Still further, the image-taking termination condition at the above step S3 is also not limited to the above-described applying of the parking brake. For example, shifting the gear to parking, or turning off the engine of the vehicle (this can be determined based on a signal from the vehicle information obtaining section 15) may be set as the image-taking termination condition. In the case where turning off the engine is set as the image-taking termination condition, the assisting apparatus 1 may be set such that the assisting apparatus 1 uses a vehicle-mounted battery or a battery embedded in the assisting apparatus 1, thereby continuing to operate until the image transfer process is completed, so as to prevent the assisting apparatus 1 from turning off immediately after the engine is turned off. Providing, directly from the user via the operation section 19, an instruction to terminate image taking may, of course, be set as the image-taking termination condition.

Also, an image storing timing determined at the above step S11 may be determined based not only on the aforementioned predetermined time interval but also on a predetermined travel distance interval. Alternatively, the image storing timing may be determined based on a turn, a brake operation and a steering wheel angle of the vehicle. In this case, the number of images to be transferred from the assisting apparatus 1 to the mobile terminal 2 can be reduced since the user can precisely arrive at the parking position as long as a place where the vehicle has turned (i.e., a corner) is specified. Thus, efficiency is obtained. Of course, the image storing timing may be determined based on a combination of these conditions. Information such as a turn, a brake operation and a steering wheel angle of the vehicle can be obtained from the vehicle information obtaining section 15.

Still further, in the above embodiment, a plurality of pieces of image data are transmitted at the same time to the mobile terminal 2 after it is determined at step S3 of FIG. 7 that image taking has been completed. However, the present invention is not limited thereto. Each time the vehicle-mounted camera 20 performs image taking (i.e., each time step S12 of FIG. 6 is performed), image data obtained from the image taking may be sequentially transmitted to the mobile terminal 2. This eliminates the necessity to wait for the image data to be transferred after the vehicle has been parked. Of course, instead of automatically transmitting the image data, a plurality of pieces of image data may be transmitted at the same time to the mobile terminal 2 when the user has directly provided a transmission instruction via the operation section 19. In this manner, image data is transferred only when the user regards the transfer as necessary, and unnecessary transfer of the image data to the mobile terminal 2 is reduced.

Still further, in the above embodiment, the vehicle-mounted camera 20 takes images of the view in the forward direction from the vehicle while the engine is in operation. However, the vehicle-mounted camera 20 may operate only when necessary. In other words, the image-taking control section 17 may control the start/end of the image taking performed by the vehicle-mounted camera 20. In this case, when the aforementioned image-taking start condition is satisfied, the image-taking control section 17 causes the vehicle-mounted camera 20 to start image taking, and also to store taken images in the image storage section 18 at the above-described timing. Then, when the image-taking termination condition is satisfied, the image-taking control section 17 may control the vehicle-mounted camera 20 to stop image taking. This eliminates the necessity to cause the vehicle-mounted camera 20 to be always in operation, and allows power consumption or the like to be reduced.

Figure 8:
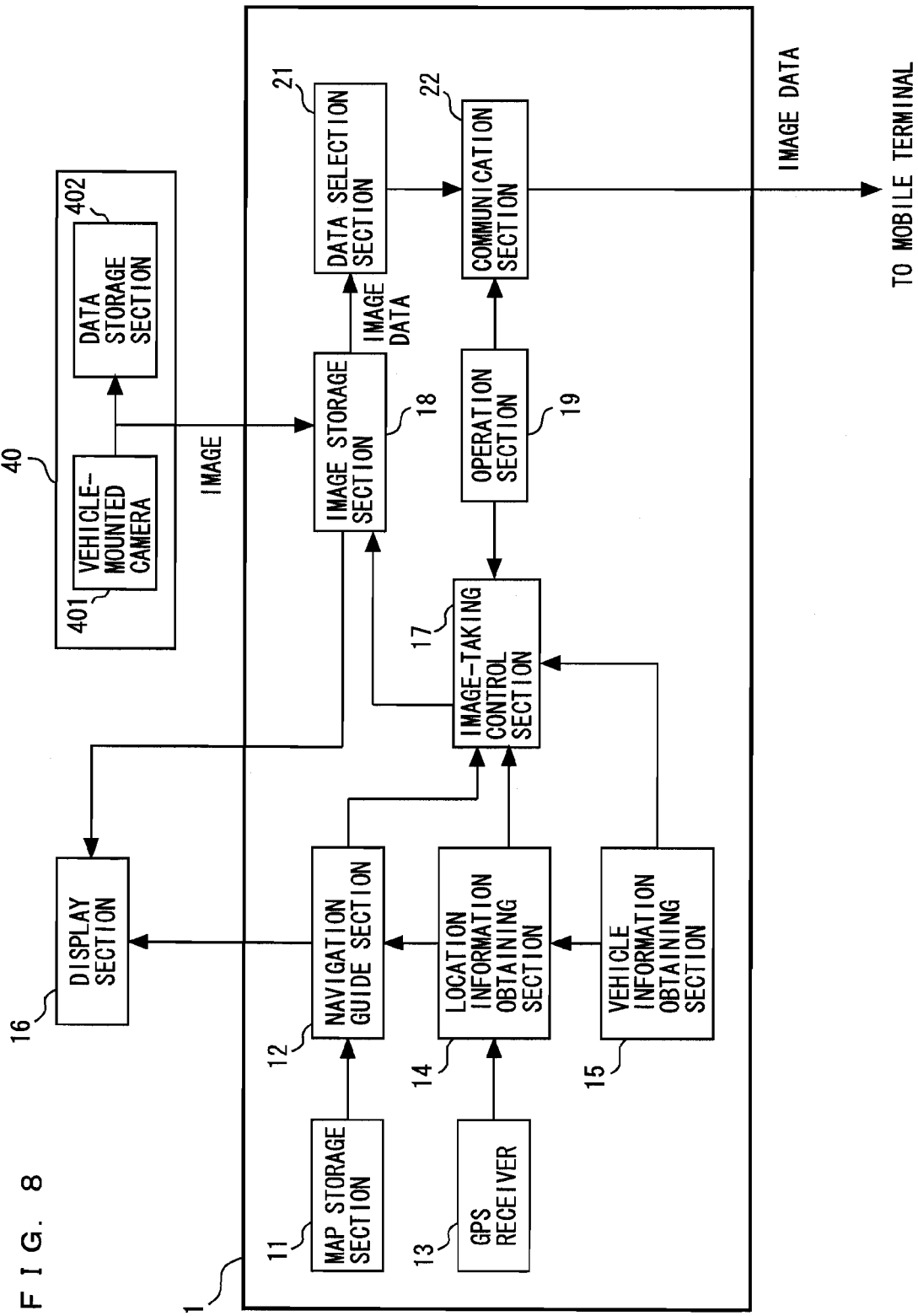
FIG. 8 is a functional block diagram showing the parking position search assisting apparatus in the case of using a drive recorder.

Still further, instead of the above-described vehicle-mounted camera 20, a drive recorder may be used. When the engine is in operation, the drive recorder always takes, from the inside of the vehicle, images of the view in the forward direction, which view is seen by the driver's sight line and visual field and includes the hood of the vehicle. Accordingly, the drive recorder is usable instead of the vehicle-mounted camera 20. In such a case, a drive recorder 40, instead of the vehicle-mounted camera 20, is provided in the assisting apparatus 1 as shown in FIG. 8. As shown in FIG. 8, the drive recorder 40 has a vehicle-mounted camera 401 and a data storage section 402 for storing taken images or the like. The image storage section 18 may store, in accordance with an instruction from the image-taking control section 17, images taken by the vehicle-mounted camera 401. Also, the data selection section 21 may directly obtain images stored in the data storage section 402, and transfer the images to the mobile terminal 2 via the communication section 22.

Still further, although in the above embodiment the images to be stored in the image storage section 18 are each a still image, the images to be stored are not limited to still images. The images may be stored as moving images. For example, all the images taken from an image-taking start timing to an image-taking end timing may be stored as moving images, and then transferred to the mobile terminal. This allows the user to recognize the parking position more easily as compared to a case where the user uses still images to check the parking position. Moreover, moving images and still images may be stored in combination. For example, it is conceivable that a still image is stored when the vehicle travels straight ahead, and a moving image is stored when the vehicle makes a turn at a curve. In this case, whether or not the vehicle is traveling straight ahead is determined based on information obtained from the vehicle information obtaining section 15, such as a traveling direction, a state of a brake and a steering wheel angle of the vehicle. Then, a still image may be stored when the vehicle is traveling straight ahead, and a moving image may be stored when the vehicle is not traveling straight ahead. As a result, required storage capacity is reduced as compared to a case where all the images are stored as moving images, and impressive movements for the user, such as making a turn at a curve, are stored as moving images. This enables the storage capacity to be saved, and effectively enables the user to recognize the parking position.

Still further, in the above embodiment, image data to be selected by the data selection section 21 at step S4 is a piece of image data, from among a plurality of pieces of image data obtained from image taking, which contains a letter or symbol. However, the image data to be selected is not limited thereto. All the stored images may be selected and transmitted. Alternatively, after the image taking is completed, a predetermined number of images may be selected and transmitted by taking into account the storage capacity of the mobile terminal 2, or a predetermined number of images may be subtracted from the number of all the images which have been stored from the start to end of image storing by the image storage section 18, so as to transmit only a particular number of images. Still alternatively, the stored images may be displayed in thumbnailed form on the display section 16 so as to allow the user to designate an image to be transferred to the mobile terminal 2.

Still further, a transmission system used herein is also not limited to such a radio communication system as Bluetooth mentioned above. The transmission system may be a different type of radio communication system such as an infrared communication system or wireless LAN, or may be a wired communication system. For example, the assisting apparatus 1 may be connected via a communication cable to a cradle which provides a connection for the mobile terminal, and the aforementioned images may be transmitted via the cradle to the mobile terminal set on the cradle (i.e., the mobile terminal having a wired connection). This enables the transfer to be performed by a different transfer method, such as a method personally preferred by the user, or a method which the user usually uses with the mobile terminal.

Alternatively, the transmission may be performed via a predetermined server. For example, the assisting apparatus 1 transmits image data, by using radio communication, to the predetermined server which is prepared in advance. Then, the server may transmit the image data to the mobile terminal 2 when the mobile terminal 2 is not used (i.e., during idle time of, e.g., a standby mode). Alternatively, the mobile terminal 2 may obtain image data from the server in response to a request from the user. This allows the user to obtain image data from the server only when necessary, i.e., only when the user has forgotten the parking position of his/her vehicle, thereby providing an advantage of reducing unnecessary transfer of image data to the mobile terminal 2 and an advantage that even if the mobile terminal 2 is not in on-state when parking the vehicle is completed, the user is able to obtain image data afterwards.

Still further, the above embodiment describes that in the case of wirelessly transmitting image data, the image data is transmitted to the mobile terminal 2, which is registered in advance as a transmission destination, by using Bluetooth technology. However, the present invention is not limited thereto. For example, the image data may be transmitted from the assisting apparatus 1 to all the mobile terminals 2 located within a predetermined distance from the assisting apparatus 1. In other words, the image data may be transmitted not only to the mobile terminal 2 of the driver of the vehicle but also to mobile terminals 2 of all the passengers of the vehicle. In this case, the transmission of the image data is not performed without approval of the user of each mobile terminal. An inquiry whether or not the transmission of the image data is acceptable may be first transmitted to each mobile terminal 2. The inquiry is displayed on the screen of each mobile terminal 2, and in response, each user inputs an answer of permission/non-permission to his/her mobile terminal 2. Then, the assisting apparatus 1 may transmit the image data only to the mobile terminal 2 to which a response to give a permission to the transmission has been inputted.

Still further, the images to be displayed on the mobile terminal 2 are not limited to the above-described images. For example, taken images simply arranged in chronological order may be displayed without using the above-described index image. Alternatively, such a table as described above in FIG. 4 may be displayed, and the user may select an arbitrary image. Still alternatively, taken images may be displayed in a particular layout which is prepared in advance. Also, information to be displayed on the mobile terminal 2 is not necessarily limited to only images. A time when an image has been taken and vehicle information obtained when the image has been taken (velocity, turn, deceleration, halt or the like) may be displayed together with the image. In addition, an image, which has been processed such that a characteristic portion thereof is emphasized, may be displayed. For example, an image, on which the aforementioned numeral or arrow is encompassed by a frame, may be generated and displayed. In this case, in the transfer process at step S4 performed by the assisting apparatus 1, the data selection section 21 analyzes pieces of image data stored in the image storage section 18, and extracts therefrom images each containing a numeral, arrow or the like. Next, the data selection section 21 draws a frame on each extracted image so as to encompass the numeral, arrow or the like. Then, each piece of image data to which the frame is added may be outputted to the communication section 22. Alternatively, instead of performing image processing in the assisting apparatus 1, the display control section 25 may process, when the mobile terminal 2 displays an image, the image so as to add a frame to the image. Thus, by displaying the vehicle information and providing a display of the image whose characteristic portion is emphasized, the user is allowed to easily remember a situation when he/she was driving, and as a result, the user can precisely recognize the parking position.

Still further, the present embodiment describes an example in which the assisting apparatus 1 has route guidance functions (i.e., functions realized by the map storage section 11, the navigation guide section 12, the GPS receiver 13, the location information obtaining section 14 and the vehicle information obtaining section 15). However, the present invention is not limited thereto. To be specific, these route guidance functions may be provided by a navigation apparatus which is independent from the assisting apparatus 1, and the assisting apparatus 1 may operate based on signals from the navigation apparatus (to be more specific, signals from the navigation guide section, location information obtaining section and the vehicle information obtaining section).

Still further, each function described in the above embodiment may be realized by a combination of a search assisting program and a computer executing the program. In this case, a processor may perform such processes as shown in FIGS. 5 and 6 in accordance with the search assisting program stored in a storage device such as a hard disk provided in the assisting apparatus 1.

INDUSTRIAL APPLICABILITY

The parking position search assisting apparatus, method and program according to the present invention are low in cost, capable of allowing the user to easily recognize his/her parking position, and useful for a vehicle-mounted navigation apparatus or the like.

The invention claimed is:

1. A parking position search assisting apparatus to be mounted on a movable body having an image taking section for taking an image, the parking position search assisting apparatus comprising:
   an image storage section for storing one or more images taken by the image taking section;
   an image-taking start condition section for determining whether or not a predetermined condition related to a start of a parking operation of the movable body is satisfied;
   an image-taking termination condition section for determining whether or not a predetermined condition related to a termination of the parking operation of the moveable body is satisfied;
   an image-taking control section for causing the image storage section to start image storing of the one or more images at predetermined time intervals from when the condition related to the start of the parking operation is determined to be satisfied, and causing the image storage section to end image storing of the one or more images when the condition related to the termination of the parking operation is determined to be satisfied; and
   a transfer section for transferring, to a predetermined mobile terminal or to a server accessible from the mobile terminal, the one or more images stored in the image storage section.

2. The parking position search assisting apparatus according to claim 1, further comprising a facility entry detection section for detecting that the movable body has entered a facility,
   wherein based on a signal from the facility entry detection section, the image-taking control section causes, when the movable body has entered a predetermined facility, the image taking section to start image taking.

3. The parking position search assisting apparatus according to claim 1, further comprising:
   a GPS receiver; and
   a navigation guide section for, based on a signal from the GPS receiver and map information, displaying a location of a vehicle on a map, or for performing route guidance.

4. The parking position search assisting apparatus according to claim 3, wherein when the movable body has arrived at a predetermined facility, the image-taking control section causes, based on a signal from the navigation guide section, the image storage section to start the image storing.

5. The parking position search assisting apparatus according to claim 3, wherein when confirming that the movable body has approached a predetermined destination within a predetermined distance and has deviated from a road, the image-taking control section causes, based on a signal from the navigation guide section, the image storage section to start the image storing.

6. The parking position search assisting apparatus according to claim 1, wherein when a parking brake of the movable body is applied, the image-taking control section causes, based on a signal from a vehicle information obtaining section for obtaining a state of the parking brake of the movable body, the image storage section to end the image storing.

7. The parking position search assisting apparatus according to claim 1, wherein when a gear of the movable body is shifted to parking, the image-taking control section causes, based on a signal from a vehicle information obtaining section for obtaining a state of the gear of the movable body, the image storage section to end the image storing.

8. The parking position search assisting apparatus according to claim 1, wherein when an engine of the movable body is turned off, the image-taking control section causes, based on a signal from a vehicle information obtaining section for obtaining a state of the engine of the movable body, the image storage section to end the image storing.

9. The parking position search assisting apparatus according to claim 1, wherein in response to the image-taking control section having caused the image storage section to end the image storing, the transfer section collectively transfers the one or more images stored in the image storage section to the mobile terminal or to the server.

10. The parking position search assisting apparatus according to claim 1, wherein each time an image taken by the image taking section is outputted from the image taking section, the transfer section sequentially transfers the one or more images stored in the image storage section to the mobile terminal or to the server.

11. The parking position search assisting apparatus according to claim 1, wherein the image-taking control section causes the image storage section to store an image from among the one or more images as a still image.

12. The parking position search assisting apparatus according to claim 1, wherein the image-taking control section causes the image storage section to store an image from among the one or more images as a moving image.

13. The parking position search assisting apparatus according to claim 1, wherein in response to a user having steered the movable body, the image-taking control section selectively causes the image storage section to store a still image or a moving image.

14. The parking position search assisting apparatus according to claim 1, wherein the transfer section includes an image selection section for selecting an image containing a letter or a symbol from among the one or more images stored in the image storage section, and transfers only the image selected by the image selection section to the mobile terminal or to the server.

15. The parking position search assisting apparatus according to claim 14, wherein
the image selection section performs image processing on the image containing a letter or a symbol so as to add a mark to the image, which mark emphasizes the letter or the symbol, and
the transfer section transfers, to the mobile terminal or to the server, the image on which the image processing has been performed.

16. The parking position search assisting apparatus according to claim 1, wherein a power supply to the parking position search assisting apparatus is halted at a time point when the engine of the movable body stops, or when a predetermined period of time has elapsed from the time point when the engine of the movable body stops, and
the transfer section completes transferring the one or more images stored in the image storage section, at the time point when the engine of the movable body stops, or before a predetermined period of time has elapsed from the time point when the engine of the movable body stops.

17. The parking position search assisting apparatus according to claim 1, wherein the transfer section transfers image data containing information indicating time points at which the one or more images stored in the image storage section have been taken, and the one or more images are displayed on the mobile terminal in chronological order.

18. The parking position search assisting apparatus according to claim 1, wherein the transfer section includes a route image generation section for generating, based on information indicating: time points at which the one or more images stored in the image storage section have been taken; and locations of the movable body when the one or more images stored in the image storage section have been taken, a route image which chronologically displays a relative route on which the movable body has traveled, and transmitting, to the mobile terminal or to the server, the route image generated by the route image generation section together with the one or more images stored in the image storage section.

19. A parking position search assisting method for a parking position search assisting apparatus to be mounted on a movable body having an image taking section for taking an image, the method comprising:
an image storing step of storing one or more images taken by the image taking section;
an image-taking start condition determining step of determining whether or not a predetermined condition related to a start of a parking operation of the movable body is satisfied;
an image-taking termination condition determining step of determining whether or not a predetermined condition related to a termination of the parking operation of the movable body is satisfied;
an image-taking controlling step of performing the image storing step at predetermined time intervals from when it is determined at the image-taking start condition determining step that the condition related to the start of the parking operation is satisfied to when it is determined at the image-taking termination determining step that the condition related to the termination of the parking operation is satisfied; and
a transferring step of transferring the one or more images stored at the image storing step to a predetermined mobile terminal or to a server accessible from the mobile terminal.

20. A non-transitory computer readable recording medium having stored thereon a parking position search assisting program to be executed by a computer of a parking position search assisting apparatus to be mounted on a movable body having an image taking section for taking an image, wherein, when executed, the parking position search assisting program causes the computer to perform a method comprising:
an image storing step of storing one or more images taken by the image taking sections;
an image-taking start condition determining step of determining whether or not a predetermined condition related to a start of a parking operation of the movable body is satisfied;
an image-taking termination condition determining step of determining whether or not a predetermined condition related to a termination of the parking operation of the movable body is satisfied;
an image-taking controlling step of causing the image storing step to store the image at predetermined time intervals from when it is determined at the image-taking start condition determining step that the condition related to the start of the parking operation is satisfied to when it is determined at the image-taking termination condition determining step that the condition related to the termination of the parking operation is satisfied; and
a transferring step of transferring the one or more images stored at the image storing step to a predetermined mobile terminal or to a server accessible from the mobile terminal.

* * * * *